US010824494B2

(12) United States Patent
Hicks et al.

(10) Patent No.: US 10,824,494 B2
(45) Date of Patent: *Nov. 3, 2020

(54) OPERATION OF A MULTI-SLICE PROCESSOR IMPLEMENTING EXCEPTION HANDLING IN A NESTED TRANSLATION ENVIRONMENT

(71) Applicant: International Business Machines Corporation, Armonk, NY (US)

(72) Inventors: Dwain A. Hicks, Pflugerville, TX (US); Jonathan H. Raymond, Richmond, VT (US); Shih-Hsiung S. Tung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/005,849

(22) Filed: Jun. 12, 2018

(65) Prior Publication Data

US 2018/0293126 A1 Oct. 11, 2018

Related U.S. Application Data

(63) Continuation of application No. 15/138,761, filed on Apr. 26, 2016, now Pat. No. 10,042,691.

(51) Int. Cl.
*G06F 11/00* (2006.01)
*G06F 11/07* (2006.01)
(Continued)

(52) U.S. Cl.
CPC ........ *G06F 11/0772* (2013.01); *G06F 11/073* (2013.01); *G06F 11/079* (2013.01);
(Continued)

(58) Field of Classification Search
CPC ............ G06F 11/0724; G06F 11/0721; G06F 2212/684
See application file for complete search history.

(56) References Cited

U.S. PATENT DOCUMENTS 5,953,520 A 9/1999 Mallick
6,438,671 B1 8/2002 Doing et al.
(Continued)

OTHER PUBLICATIONS

IBM, *Per-Thread Valid Bits for Multithreaded Effective to Real Address Translation (ERATs)*, An IP.com Prior Art Database Technical Disclosure (online), IP.com No. IPCOM000022179D, URL: https://ip.com/IPCOM/000022179, dated Mar. 1, 2004, 2 pages.
(Continued)

*Primary Examiner* — Christopher S McCarthy
(74) *Attorney, Agent, or Firm* — Nathan M. Rau

(57) ABSTRACT

Operation of a multi-slice processor that includes a plurality of execution slices, a plurality of load/store slices, and one or more translation caches, where operation includes: determining, at the load/store slice, a real address from a cache hit in the translation cache for an effective address for an instruction received at a load/store slice; determining, at the load/store slice, an error condition corresponding to an access of the real address; determining, at the load/store slice, a process type indicating a source of the instruction to be a guest process; and responsive to determining the error condition, initiating, in dependence upon the process type indicating a source of the instruction to be a guest process, an effective address translation corresponding to a cache miss in the translation cache for the effective address for the instruction.

20 Claims, 6 Drawing Sheets

(51) Int. Cl.
  *G06F 12/14* (2006.01)
  *G06F 12/1027* (2016.01)
  *G06F 12/10* (2016.01)

(52) U.S. Cl.
  CPC .......... *G06F 11/0751* (2013.01); *G06F 12/10* (2013.01); *G06F 12/1027* (2013.01); *G06F 12/1425* (2013.01); *G06F 2212/1021* (2013.01); *G06F 2212/151* (2013.01); *G06F 2212/65* (2013.01); *G06F 2212/684* (2013.01)

(56) References Cited

U.S. PATENT DOCUMENTS

| | | |
|---|---|---|
| 6,792,521 B2 | 9/2004 | Arimilli et al. |
| 6,950,978 B2 | 9/2005 | Arndt et al. |
| 7,334,107 B2 | 2/2008 | Schoinas et al. |
| 8,397,219 B2 | 3/2013 | Vick et al. |
| 8,560,897 B2 | 10/2013 | Comparan et al. |
| 8,904,109 B2 | 12/2014 | Moyer |
| 9,081,501 B2 | 7/2015 | Asaad et al. |
| 9,639,364 B2 | 5/2017 | Abdallah |
| 9,733,942 B2 | 8/2017 | Abdallah |
| 9,760,496 B2 | 9/2017 | Eddy |
| 2014/0379956 A1* | 12/2014 | Chang ................. G06F 12/1027 711/6 |
| 2017/0168821 A1 | 6/2017 | Bowman et al. |
| 2017/0168831 A1 | 6/2017 | Barrick et al. |
| 2017/0168834 A1 | 6/2017 | Barrick et al. |
| 2017/0168835 A1 | 6/2017 | Barrick et al. |
| 2017/0168836 A1 | 6/2017 | Bowman et al. |
| 2017/0220466 A1* | 8/2017 | Gupta ................... G06F 12/084 |
| 2017/0269937 A1 | 9/2017 | Eickemeyer et al. |
| 2017/0277542 A1 | 9/2017 | Fernsler et al. |
| 2017/0277543 A1 | 9/2017 | McGlone et al. |
| 2017/0308425 A1 | 10/2017 | Hicks et al. |

OTHER PUBLICATIONS

Appendix P; List of IBM Patent or Applications Treated as Related, Jun. 12, 2018, 2 pages.

* cited by examiner

OPERATION OF A MULTI-SLICE PROCESSOR IMPLEMENTING EXCEPTION HANDLING IN A NESTED TRANSLATION ENVIRONMENT

CROSS-REFERENCE TO RELATED APPLICATION

This application is a continuation application of and claims priority from U.S. patent application Ser. No. 15/138,761, filed Apr. 26, 2016.

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a plurality of load/store slices, where the load/store slices are coupled to the execution slices via a results bus. Such a multi-slice processor may further include a translation cache. Operation of such a multi-slice processor includes: determining, at a load/store slice, a real address from a cache hit in the translation cache for an effective address for an instruction received at the load/store slice; determining, at the load/store slice, an error condition corresponding to an access of the real address; determining, at the load/store slice, a process type indicating a source of the instruction to be a guest process; and responsive to determining the error condition, initiating, in dependence upon the process type indicating a source of the instruction to be a guest process, an effective address translation corresponding to a cache miss in the translation cache for the effective address for the instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
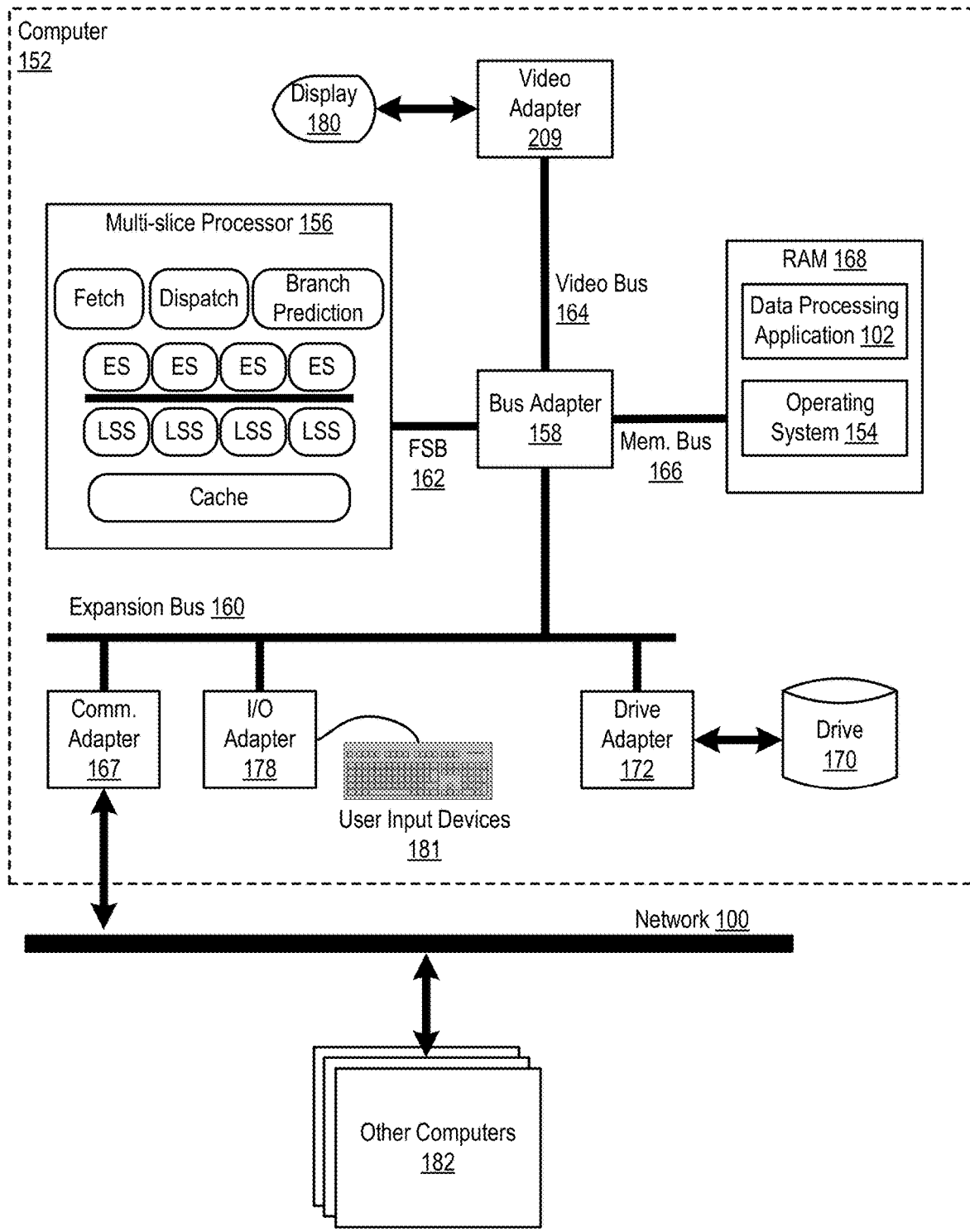
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
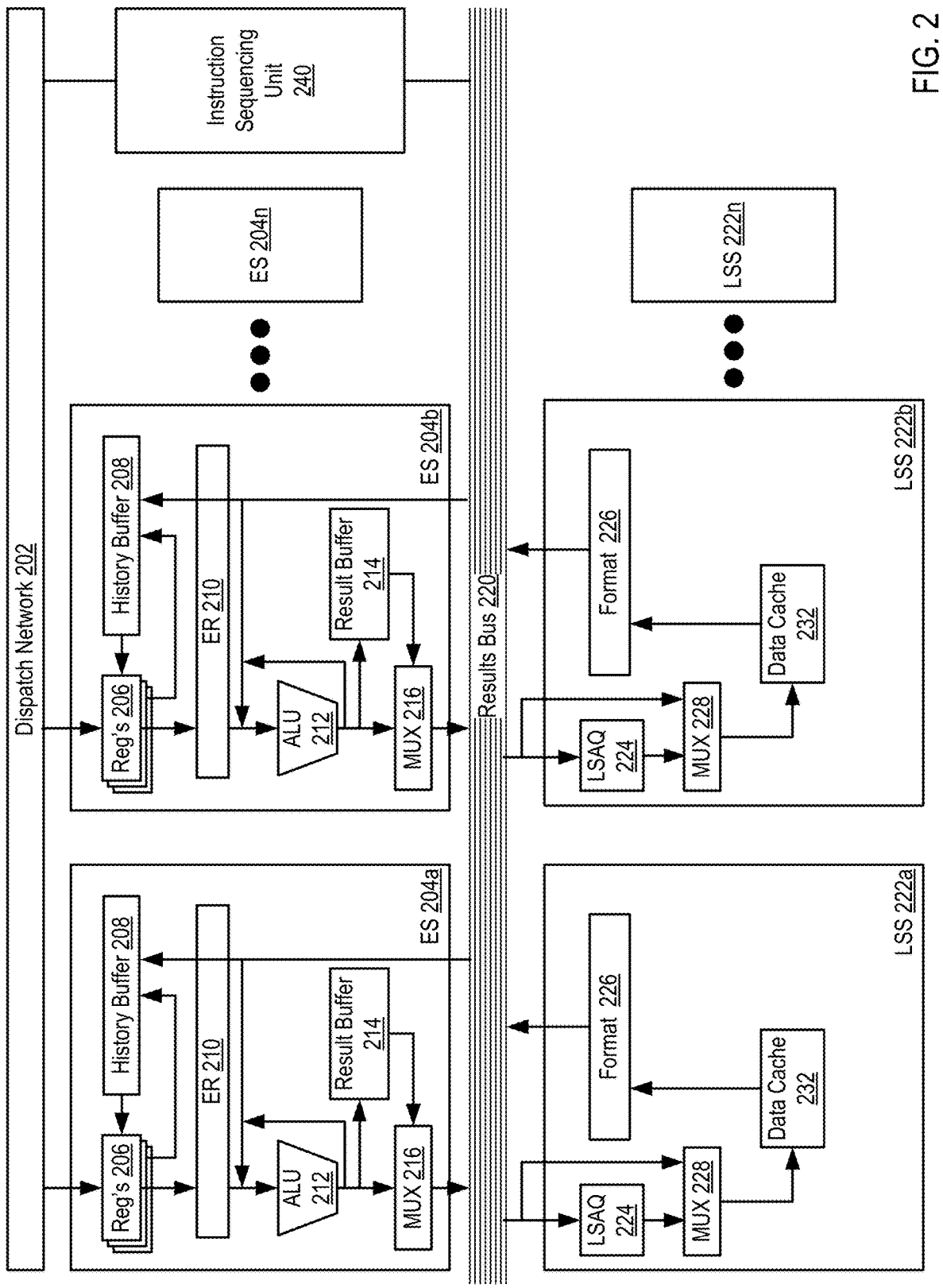
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load/store slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), and formatting logic (226), among other components described below with regard to FIG. 3. The queue receives load and store operations to be carried out by the load/store slice (222). The formatting logic (226) formats data into a form that may be returned on the results bus (220) to an execution slice as a result of a load or store instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted as a single unit, each of the plurality of execution slices may include a respective instruction sequencing unit similar to instruction sequencing unit (240). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions as determined by an ITAG. Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
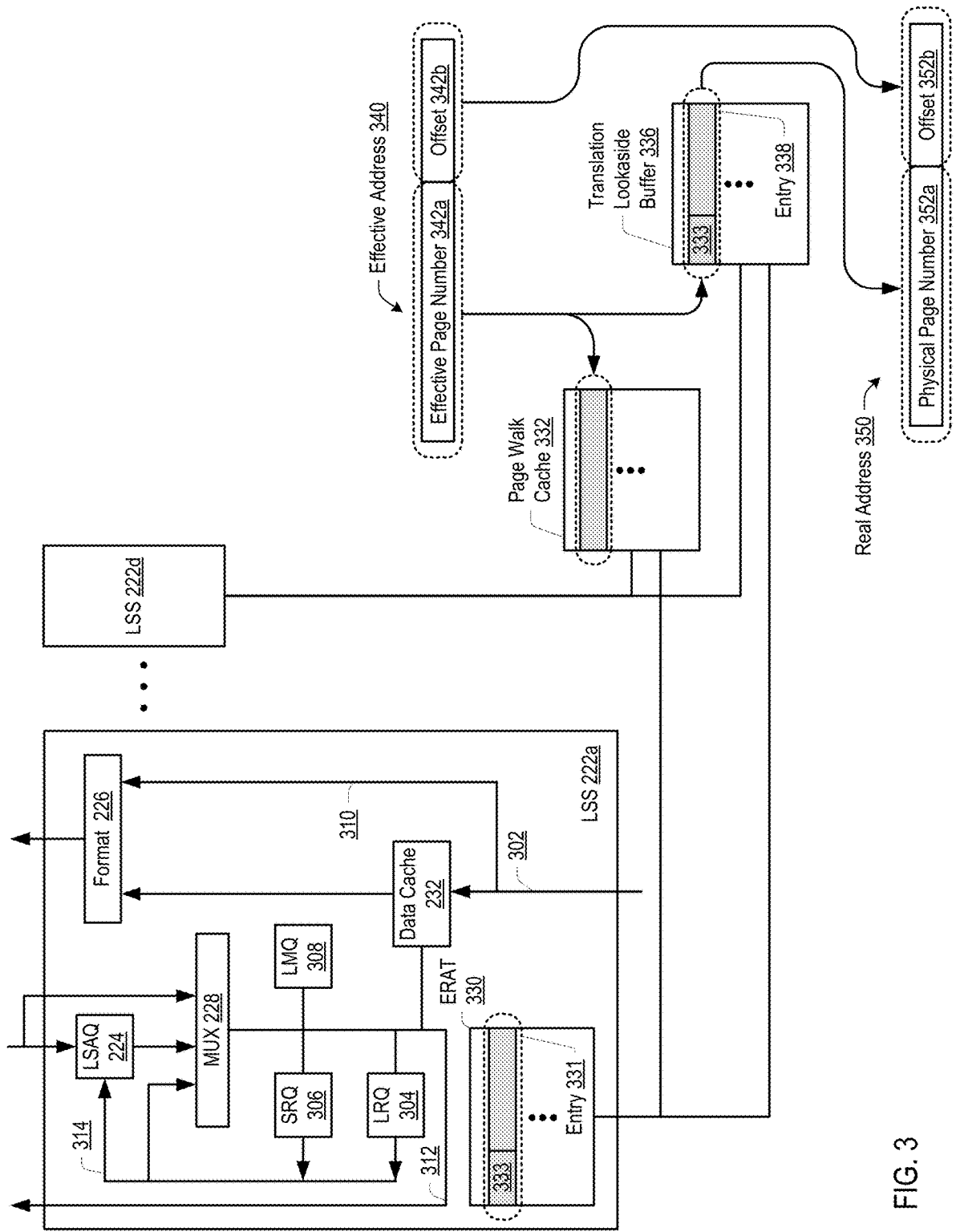
FIG. 3 sets forth a block diagram of a portion of a load/store slice of a multi-slice processor, where the load/store slice implements exception handling in a nested translation environment according to different embodiments.

For further explanation, FIG. 3 sets forth a block diagram depicting an expanded view of a load/store slice (222a) implementing architectural components that include a load/store access queue (LSAQ) (224), a load reorder queue (LRQ) (304), a load miss queue (LMQ) (308), a store reorder queue (SRQ) (306), a data cache (232), an effective address to real address (ERAT) (330) cache, a page walk cache (332), a translation lookaside buffer (TLB) (336), among other components.

The load/store slice (222a) may retrieve data from and store data to any tier of a memory hierarchy, beginning with a local data cache (232), and extending as far down in the hierarchy as needed to find requested data or to store data. Requested data, when received, may be provided to general purpose registers, virtual registers, or to some other destination. The received data may also be stored in a data cache (232) for subsequent access. The load/store slice (222a) may also manage translations of effective addresses to real addresses to communicate with or access different levels of memory hierarchy.

A store reorder queue (306) may include entries for tracking the cache operations for sequential consistency and may reissue operations into the load/store pipeline for execution independent of an execution slice. For example, the store reorder queue (306) may signal the load/store access queue (224) to reissue an instruction along line (314).

A load miss queue (308) may issue requests for data to one or more data storage devices of a multi-tiered memory hierarchy, where a request for data may correspond to a load instruction for the data.

Responsive to the data being returned along the line (302) to the load/store slice (222a), the data may be delivered to a destination such as the results bus (220 of FIG. 2) to be loaded into, for example, a general purpose register—where the delivery of the data may be from the data cache (232) or over the line (310). The line (310) bypasses the data cache (232) and allows implementation of a critical data forwarding path. The load reorder queue (304) may also use line (312) to notify an instruction sequencing unit, or some other logical component, that the data is available.

A load reorder queue (304) may track execution of cache operations issued to the load/store slice (222a) and includes entries for tracking cache operations for sequential consistency, among other attributes. The load reorder queue (304) may also reissue operations into the load/store pipeline for execution, which provides operation that is independent of the execution slices. For example, the load reorder queue (304) may signal the load/store access queue (224) to reissue an instruction along line (314).

The effective address to real address (330) cache may be implemented on individual load/store slices, where the effective address to read address (330) cache may be indexed according to an effective address field of an instruction, where an indexed entry of the effective to real address (330) cache may store a correspondingly mapped real address field.

The translation lookaside buffer (336) may be implemented as a cache that may be indexed according to an effective address field of an instruction, where an indexed entry of the translation lookaside buffer (336) may store a correspondingly mapped real address field. Further, the translation lookaside buffer (336) may be coupled to one or more load/store slices. As depicted in the example configuration of FIG. 3, translation lookaside buffer (336) may be coupled to and provide translations for load/store slices (222a)—(222d), where a value for "d" may vary, and may include 2, 4, or 8, among other possibly values. A table, or directory, of translations may be defined according to a user-level process.

The page walk cache (332) may be implemented as a cache that may be indexed according to an effective address field. However, instead of storing translation addresses, the page walk cache (332) may store a reference to a page table, which, on a cache miss of a translation cache, may allow avoiding multiple levels of address translations and loading and accessing multiple different levels of page directories.

A load/store slice (222a), for a given load or store instruction specifying an effective or virtual address, may perform a translation from the effective address to a real address. An effective address may correspond to an address space defined for a host process, which may also be referred to as a hypervisor, or to an address space defined for a guest process, which may also be referred to as a virtual instance of an operating system. In the case of a host process, a real address may specify a location or physical address within a physical storage device. In the case of a guest process, which may be considered to be nested within a host process, what is a real address to the guest process may need additional translation to specify a location or physical address within a physical storage device—where the host process may specify page table mappings of real address from the guest process to physical addresses within physical storage devices.

In other words, generally, translations from effective addresses to real addresses may go through multiple levels of translation—where a combination of the effective address to real address (330) cache, the translation lookaside buffer (336), and the page walk cache (332) may serve to store different results of previous address translations to speed future address translations.

Effective address to real address translations may be stored within different tiers of memory having different performance characteristics, with a first tier being the effective address to real address (330) cache, a second tier being the translation lookaside buffer (336), a third tier being one or more page tables reachable through one or more page directories stored in a lower tier or tiers of processor memory. The effective address to real address (330) cache and the translation lookaside buffer (336) may both cache results of previous address translations retrieved from stored page tables. The page walk cache (332) may store results that allow the avoidance of performing a full page walk through every level of a multi-level address translation.

The load/store slice (222a), in performing an effective address to real address translation for a load or store instruction, may first use an effective page number (342a) field of the effective address of the instruction to index the effective address to real address translation (330) cache. If there is a hit, then the entry for the hit provides the translation of an effective page number to a physical page number—where the real address used to access physical memory is comprised of the physical page number from the entry and an offset from an offset field of the effective address.

Otherwise, on a miss of the effective address to real address (330) cache, the load/store slice (222a) may index the translation lookaside buffer (336) using the effective page number (342a) of the effective address (340). If there is a hit, then the entry for the hit provides the translation for the effective page number (342a) of the effective address (340) to physical page number (352a)—where the real address (350) used to access physical memory is comprised of the physical page number (352a), which may be obtained from the stored value in entry (338). Further, the offset (342b) field of the effective address (340) may be used in specifying the offset (352b) of the real address (350).

Otherwise, on a miss of the translation lookaside buffer (336), the load/store slice (222a) may perform a page walk of the multiple nested levels of address translation—where each level may correspond to a page directory indexed by a portion of the effective address ultimately leading to a page table storing effective to real translation addresses. The page directories and page tables may be read from lower tiers of processor memory.

The page walk cache (332) may be used to store a reference to a page directory leading to a page table including the translation for the effective address, where a subsequent page walk may avoid loading and referencing each of the page directories leading up to the page table storing the translation if the effective address results in a hit on an entry for a previously cached effective address. The translation retrieved from the page table at the end of a page walk may be stored in the translation lookaside buffer (336) or the effective address to real address (330) cache, or both.

With regard to exception handling in a nested translation environment, in some cases, translation of an effective address to a real address lead to an error or exception—and determining an appropriate process, at an appropriate level of nesting, for receiving an exception may be complicated since the error may be due to causes within a different level of nesting.

Identifying a location of a fault corresponding to an access of a real address in a nested translation environment may depend upon going through the steps of an address translation or page walk. Therefore, if an error is detected with regard to an access of a real address—the multi-slice processor may initiate an address translation process in spite of, or in contravention of, a translation cache hit of the effective address for the real address. In other words, even though a translation cache may indicate a cache hit for an effective address of an instruction received at a load/store slice—which would normally not initiate an address translation process, or page walk because the cache hit would produce a real address—a page walk, or address translation is forced so that a source or location of a translation error or fault may be specifically identified. In this way, information describing the error may be provided in a generated exception to a corresponding process at a corresponding nested processing level.

Forcing a page walk, or address translation, despite a translation cache hit may depend upon whether a process that is the source of an instruction corresponding to the fault is a host process or a guest process. Further, determining whether or not a process is a host process or guest process may be carried out by a translation cache storing information in a field of an entry of the translation cache that indicates whether a process that is the source of an instruction corresponding to a fault is a host process or a nested, guest process. For example, if the process is a host process, no page walk is forced and an exception is directed to the host process. However, if the process is a guest process, a page walk, or translation sequence, may be forced and the location of the fault determined on the forced translation sequence may be reported to either the guest process or the host process—depending on the location of the fault during the address translation, where if the fault occurred during the guest address translation sequence, then an exception is generated and directed to the guest process, and where if the fault occurred during a host process address translation of a guest process real address, then an exception is generated and directed to the host process. For example, in some cases, a host process alone may be requesting a memory operation that invokes an address translation sequence. In other cases, the host process may be an intermediary between a nested, guest process and the underlying machine, in which case, an address translation sequence occurs within the scope of the guest process to translate an effective address in the guest process address space to a real address in the guest process address space, and another address translation sequence occurs when the host process translates the guest process real address, which from the perspective of the host process is an effective address, into a host process real address, which is a hardware level real address. In short, if the error occurs during a guest process address translation sequence, then the guest process may be notified without notifying the host process since the scope of the problem is within the address space specified by the guest process. The field of the entry of the translation cache may be set at a point corresponding to the loading of the translation cache entry with a translation address or be set at some other point in time at which a process source for the instruction is identified as a host process or a guest process. A host process may also be referred to as a hypervisor, and a nested process within the host process may be referred to as a guest process.

Given a determination of information corresponding to a particular address translation fault, the multi-slice processor may determine a corresponding process at a corresponding processing level in a nested translation environment to notify with the information describing the error or fault. Identifying a corresponding process may be carried out by referencing a register file storing information for a source of an instruction being handled at the load/store slice, or by some other method that associates a particular instruction with a particular source host process or source guest process. Further, the register file may include a bit or flag that is set in dependence upon a current interrupt.

Figure 4:
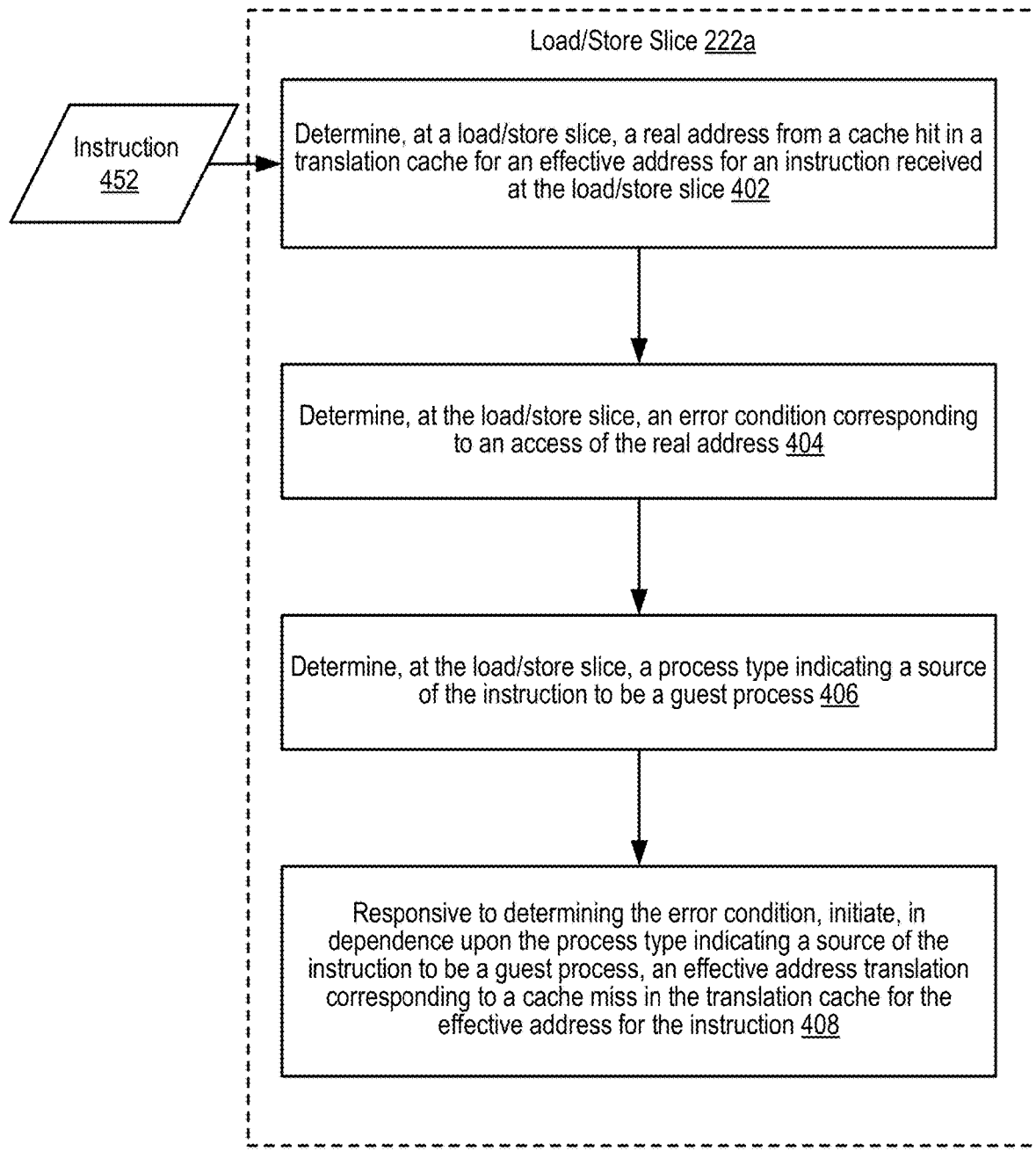
FIG. 4 sets forth a block diagram of a portion of a load/store slice of a multi-slice processor, where the load/store slice implements exception handling in a nested translation environment according to different embodiments.

For further explanation, FIG. 4 sets forth a flow chart illustrating an exemplary method of operation of a multi-slice processor implementing exception handling in a nested translation environment. The method of FIG. 4 may be carried out by a multi-slice processor similar to that in the examples of FIGS. 1-3. Such a multi-slice processor may include a translation cache and a plurality of load/store slices (220a-220n), where a load/store slice (222) may include a load/store access queue (224), as described above with regard to FIGS. 2 and 3.

The method of FIG. 4 includes determining (402), at a load/store slice (222a), a real address from a cache hit in a translation cache for an effective address for an instruction (452) received at the load/store slice (222a). Determining (402) the real address may be carried out by the load/store slice (222a) indexing a translation cache, such as the effective address to real address (330) cache with the effective address portion of an instruction received at a load/store access queue (224). The effective address portion may be an effective page number (342a) of the effective address (340) of an instruction.

The translation cache may be a content-addressable memory, associative memory, or some other type of memory that may be indexed according to an address. In some cases, the translation cache may be a translation lookaside buffer (336). For example, if there is a miss in the effective address to real address translation (330) cache, there may be a cache hit in the translation lookaside buffer (336) for the same effective address portion of the instruction received.

The method of FIG. 4 also includes determining (404), at the load/store slice (222a), an error condition corresponding to an access of the real address. Determining (404) the error condition may be carried out by the load/store slice (222a) determining access permissions for the real address and whether an access of the real address would violate one or more of the access permissions, where the access permissions may be stored in an entry for the translation cache. The access permissions may specify read only access, read/write access, or some other type of access permission, where access permissions may be specified by a host process or hypervisor, or according to some other memory configuration setting.

The method of FIG. 4 also includes determining (406), at the load/store slice (222a), a process type indicating a source of the instruction to be a guest process. Determining (406) a process type may be carried out by the load/store slice (222a) accessing a field, such as field (333), of an entry (331) corresponding to the cache hit of the effective address of the instruction, where the field includes information identifying a source of the instruction as a host process or a guest process. In some cases, a process mapping table may be referenced which stores mappings of field (333) values with process types. While in this example, there are two process types, in general, any number of process types may be specified with any number of nesting levels.

The method of FIG. 4 also includes, responsive to determining an error condition, initiating (408), in dependence upon the process type indicating a source of the instruction to be a guest process, an effective address translation corresponding to a cache miss in the translation cache for the effective address for the instruction. Initiating (408), or forcing, an effective address translation may be carried out by overriding the default behavior of a cache hit—where the default behavior of a cache hit is to use the real address in the translation cache and not perform a full address translation or page walk—and to force behavior corresponding to a cache miss.

The forced cache miss may be carried out by resubmitting the effective address for translation along with providing an indication that a forced cache miss is being performed, where the indication of a forced cache miss allows for overriding cache hits in the effective address to real address (330) cache and for overriding cache hits in the translation lookaside buffer (336). In other words, a forced page walk is carried out. As the address translation is performed, a specific location or source of the fault may be identified as the address translation. Further, in some cases, the translation during the rewalk, or forced translation, is not stored in either the translation lookaside buffer or the effective address to real address (330) cache since the translation values are already stored.

In other words, a page walk may perform an iterative translation of the multiple levels of address translation—where each level may correspond to a page directory indexed by a portion of the effective address ultimately leading to a page table storing effective to real translation addresses. The page directories and page tables may be read from lower tiers of processor memory.

A page walk cache (332) may be used to store a reference to a page directory leading to a page table including the translation for the effective address, where a subsequent page walk may avoid loading and referencing each of the page directories leading up to the page table storing the translation if the effective address results in a hit on an entry for a previously cached effective address. The translation retrieved from the page table at the end of a page walk may be stored in the translation lookaside buffer (336) or the effective address to real address (330) cache, or both. However, in this example of a forced page walk, the address translation value is already stored in an entry of a translation cache, therefore, it is unnecessary to store a translation result from a page walk into the translation cache.

In this way, in the case that an error condition occurs during a guest process address translation sequence, for the guest process—which may be nested within a host process—a fault location and explanation may be determined and exception handling logic may generate an exception directed to the guest process with information regarding the fault, which may reduce complexity of any software processes in identifying a fault location and explanation. Further, in the case that an error condition occurs during a guest process address translation sequence, the host process need not be informed any address translation errors, and consequently, the host process need not expend resources to handle an exception that may be handled by the guest process.

Figure 5:
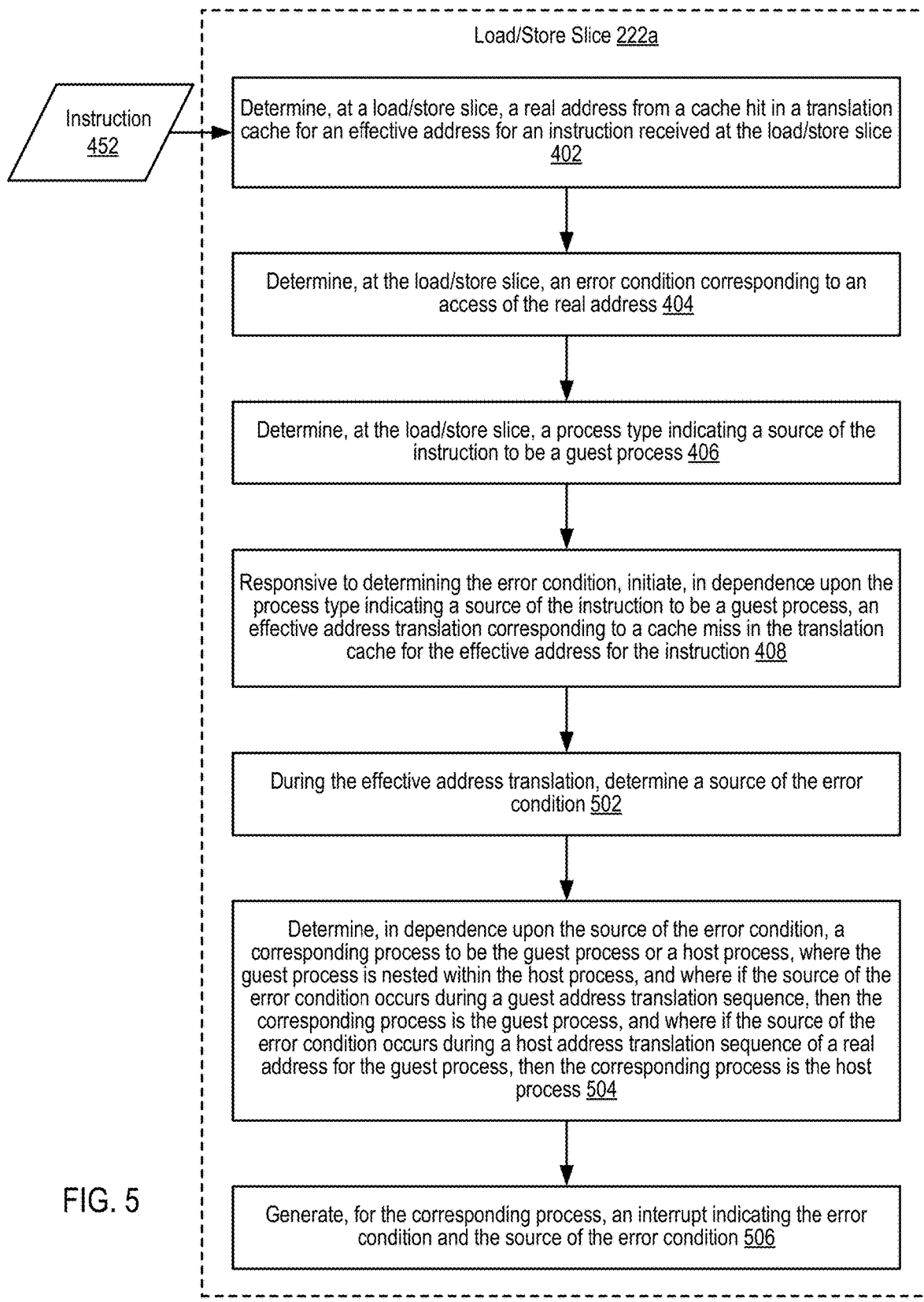
FIG. 5 sets forth a flow chart illustrating an exemplary method of operation of a multi-slice processor in which a load/store slice is configured to implements exception handling in a nested translation environment according to different embodiments.

For further explanation, FIG. 5 sets forth a flow chart illustrating an exemplary method of operation of a multi-slice processor implementing exception handling in a nested translation environment. The method of FIG. 5 may be carried out by a multi-slice processor similar to that in the examples of FIGS. 1-3. Such a multi-slice processor may include a translation cache and a plurality of load/store slices (220a-220n), where a load/store slice (222) may include a load/store access queue (224), as described above with regard to FIGS. 2 and 3.

The method of FIG. 5 is similar to the method of FIG. 4 in that the method of FIG. 5 also includes determining (402), at a load/store slice (222a), a real address from a cache hit in a translation cache for an effective address for an instruction (452) received at the load/store slice (222a); determining (404), at the load/store slice (222a), an error condition corresponding to an access of the real address; determining (406), at the load/store slice (222a), a process type indicating a source of the instruction to be a guest process; and responsive to determining an error condition, initiating (408), in dependence upon the process type indicating a source of the instruction to be a guest process, an effective address translation corresponding to a cache miss in the translation cache for the effective address for the instruction.

Figure 6:
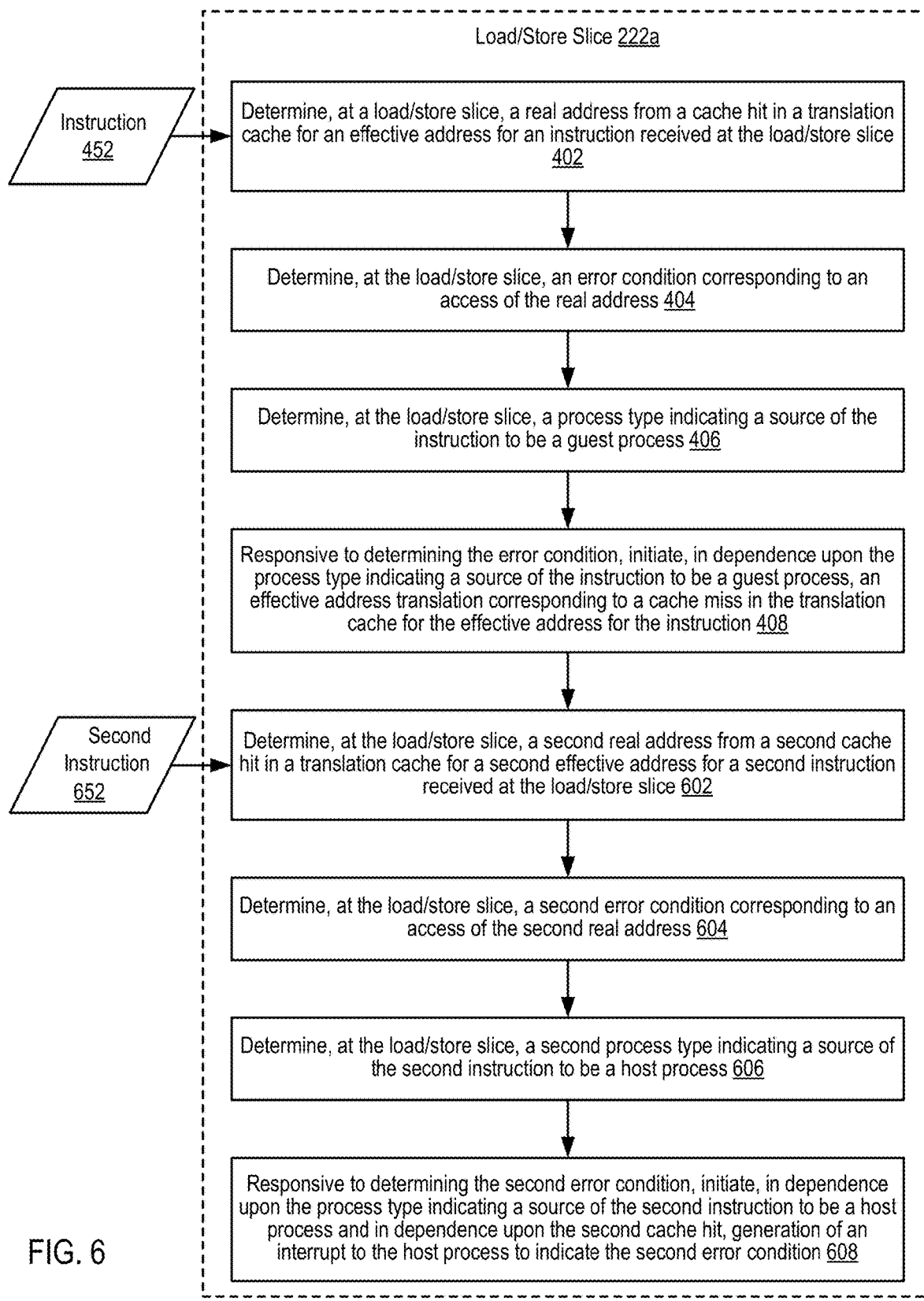
FIG. 6 sets forth a flow chart illustrating an exemplary method of operation of a multi-slice processor in which a load/store slice is configured to implements exception handling in a nested translation environment according to different embodiments.

The method of FIG. 5 differs from the method of FIG. 4, however, in that the method of FIG. 6 further includes: during the effective address translation, or forced page walk, determining (502) a source of the error condition; determining (504), in dependence upon the source of the error condition, a corresponding process to be the guest process or a host process, where the guest process is nested within the host process, and where if the error condition occurs during a guest address translation sequence, then the corresponding process is the guest process, and where if the error condition occurs during a host address translation sequence of a real address for the guest process, then the corresponding process is the host process; and generating (506), for the corresponding process, an interrupt indicating the error condition and the source of the error condition.

Determining (502), the source of the error condition may be carried out by the load/store slice performing an address translation as if there were no corresponding address translation in either the effective address to real address (330) cache or the translation lookaside buffer (336).

Determining (504) the corresponding process may be carried out by the load/store slice determining whether the error condition occurred during a guest address translation sequence or whether the error occurred during a host process translation of a real address for the guest process in dependence upon which translation tables were being accessed at the time of the translation sequence, and in dependence upon whether the translation tables correspond to the guest process address translation or whether the translation tables correspond to the host process address translation. As noted above, a guest process may specify effective address to real address translations, and corresponding guest translation tables and guest page directories where the real addresses from the perspective of the guest process are not real addresses with respect to the hardware level memory, rather, the real address from the perspective of the guest process is further address translated according to the host translation tables and host page directories.

Generating (506), for the corresponding process, an interrupt indicating the error condition and the source of the error condition may be carried out by the load/store slice (222a) notifying exception handling logic to generate an interrupt, where the notification to the exception handling logic may include one or more of a nesting level, a process type, a process identifier, an error or fault code or codes, or information describing at which point during the address translation the fault or faults occurred.

In this way, a guest process, which is the source of the instruction corresponding to the error condition, may be notified with information sufficient to handle and possibly correct the error condition—in some cases without a host process being involved with resolving the error condition or handling the interrupt.

For further explanation, FIG. 6 sets forth a flow chart illustrating an exemplary method of operation of a multi-slice processor implementing exception handling in a nested translation environment. The method of FIG. 6 may be carried out by a multi-slice processor similar to that in the examples of FIGS. 1-3. Such a multi-slice processor may include a translation cache and a plurality of load/store slices (220a-220n), where a load/store slice (222) may include a load/store access queue (224), as described above with regard to FIGS. 2 and 3.

The method of FIG. 6 is similar to the method of FIG. 4 in that the method of FIG. 6 also includes determining (402), at a load/store slice (222a), a real address from a cache hit in a translation cache for an effective address for an instruction (452) received at the load/store slice (222a); determining (404), at the load/store slice (222a), an error condition corresponding to an access of the real address; determining (406), at the load/store slice (222a), a process type indicating a source of the instruction to be a guest process; and responsive to determining an error condition, initiating (408), in dependence upon the process type indicating a source of the instruction to be a guest process, an effective address translation corresponding to a cache miss in the translation cache for the effective address for the instruction.

The method of FIG. 6 differs from the method of FIG. 4, however, in that the method of FIG. 6 further includes: determining (602), at the load/store slice (222a), a second real address from a second cache hit in the translation cache for a second effective address for a second instruction (652) received at the load/store slice (222a); determining (604), at the load/store slice (222a), a second error condition corresponding to an access of the second real address; determining (606), at the load/store slice (222a), a second process type indicating a source of the second instruction to be a host process; and responsive to determining the second error condition, initiating (608), in dependence upon the process type indicating a source of the second instruction to be a host process and in dependence upon the second cache hit, generating an interrupt to the host process to indicate the second error condition.

Determining (602) a second real address may be carried out by the load/store slice (222a) indexing a translation cache, such as the effective address to real address (330) cache with the effective address portion of the second instruction (652) received at a load/store access queue (224).

For example, the effective address portion may be effective page number (342a) of the effective address (340) of the second instruction (652).

Determining (604) a second error condition may be carried out by the load/store slice (222a) determining access permissions for the real address and whether an access of the real address would violate one or more of the access permissions, where the access permissions may be stored in an entry for the translation cache. The access permissions may specify read only access, read/write access, or some other type of access permission, where access permissions may be specified by a host process or hypervisor, or according to some other memory configuration setting.

Determining (606) a second process type indicating a source of the second instruction to be a host process may be carried out by the load/store slice (222a) accessing a field, such as field (333), of an entry corresponding to the cache hit of the effective address of the instruction, where the field includes information identifying a source of the instruction as a host process or a guest process. In some cases, a process mapping table may be referenced which stores mappings of field (333) values with process types. While in this example, there are two process types, in general, any number of process types may be specified with any number of nesting levels.

Initiating (608), in dependence upon the process type indicating a source of the second instruction to be a host process and in dependence upon the second cache hit, generating an interrupt to the host process to indicate the second error condition may be carried out by the load/store slice (222a) signaling exception handling logic to generate an interrupt—where the exception handling logic may be provided with information specifying a source or location of the fault or error condition to the host process.

In short, in contrast to a fault occurring during an address translation for a guest process—where a page walk is forced regardless of a cache hit—a fault that is detected during an address translation for a host process does not incur a forced page walk to locate a source of the fault.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a translation cache, a plurality of execution slices, and a plurality of load/store slices, the method comprising:
    determining, at the load/store slice, an error condition corresponding to an access of a real address by an instruction, wherein a source of the instruction is a guest process; and
    responsive to determining the error condition, initiating, in dependence upon the source of the instruction being a guest process, and independent of a cache miss, an effective address translation corresponding to a cache miss in a translation cache for an effective address for the instruction.

2. The method of claim 1, further comprising:
    during the effective address translation, determining a source of the error condition;
    determining, in dependence upon a source of the error condition, a corresponding process to be the guest process or a host process, wherein the guest process is nested within the host process, wherein if the source of the error condition occurs during a guest address translation sequence, then the corresponding process is the guest process, and wherein if the source of the error condition occurs during a host address translation sequence of a real address for the guest process, then the corresponding process is the host process; and generating, for the corresponding process, an interrupt indicating the error condition and the source of the error condition.

3. The method of claim 1, wherein the effective address translation for the effective address for the instruction corresponding to the cache miss is initiated in contravention of a cache hit for the effective address for the instruction.

4. The method of claim 1, further comprising:
determining, at the load/store slice, a second real address from a second cache hit in the translation cache for a second effective address for a second instruction received at the load/store slice;
determining, at the load/store slice, a second error condition corresponding to an access of the second real address;
determining, at the load/store slice, a second process type indicating a source of the second instruction to be a host process; and
responsive to determining the second error condition, initiating, in dependence upon a source of the second instruction being a host process and in dependence upon the second cache hit, generation of an interrupt to the host process to indicate the second error condition.

5. The method of claim 1, wherein an entry of the translation cache storing the read address corresponding to a translation of the effective address stores a field indicating a process type.

6. The method of claim 1, wherein the translation cache is an effective address to real address cache or a translation lookaside buffer.

7. The method of claim 1, wherein the error condition comprises a violation of an access permission specified by a host process, and wherein the guest process is nested within the host process.

8. A multi-slice processor comprising:
a translation cache, a plurality of execution slices, and a plurality of load/store slices, wherein the multi-slice processor is configured to carry out:
determining, at the load/store slice, an error condition corresponding to an access of a real address by an instruction, wherein a source of the instruction is a guest process; and
responsive to determining the error condition, initiating, in dependence upon the source of the instruction being a guest process, and independent of a cache miss, an effective address translation corresponding to a cache miss in a translation cache for an effective address for the instruction.

9. The multi-slice processor of claim 8, wherein the multi-slice processor is further configured to carry out:
during the effective address translation, determining a source of the error condition;
determining, in dependence upon a source of the error condition, a corresponding process to be the guest process or a host process, wherein the guest process is nested within the host process, wherein if the source of the error condition occurs during a guest address translation sequence, then the corresponding process is the guest process, and wherein if the source of the error condition occurs during a host address translation sequence of a real address for the guest process, then the corresponding process is the host process; and
generating, for the corresponding process, an interrupt indicating the error condition and the source of the error.

10. The multi-slice processor of claim 8, wherein the effective address translation for the effective address for the instruction corresponding to the cache miss is initiated in contravention of a cache hit for the effective address for the instruction.

11. The multi-slice processor of claim 8, wherein the multi-slice processor is further configured to carry out:
determining, at the load/store slice, a second real address from a second cache hit in the translation cache for a second effective address for a second instruction received at the load/store slice;
determining, at the load/store slice, a second error condition corresponding to an access of the second real address;
determining, at the load/store slice, a second process type indicating a source of the second instruction to be a host process; and
responsive to determining the second error condition, initiating, in dependence upon a source of the second instruction being a host process and in dependence upon the second cache hit, generation of an interrupt to the host process to indicate the second error condition.

12. The multi-slice processor of claim 8, wherein an entry of the translation cache storing the read address corresponding to a translation of the effective address stores a field indicating a process type.

13. The multi-slice processor of claim 8, wherein the translation cache is an effective address to real address cache or a translation lookaside buffer.

14. The multi-slice processor of claim 8, wherein the error condition comprises a violation of an access permission specified by a host process, and wherein the guest process is nested within the host process.

15. An apparatus comprising:
a multi-slice processor, wherein the multi-slice processor comprises:
a translation cache, a plurality of execution slices, and a plurality of load/store slices, wherein the multi-slice processor is configured to carry out:
determining, at the load/store slice, an error condition corresponding to an access of a real address by an instruction, wherein a source of the instruction is a guest process; and
responsive to determining the error condition, initiating, in dependence upon the source of the instruction being a guest process, and independent of a cache miss, an effective address translation corresponding to a cache miss in a translation cache for an effective address for the instruction.

16. The apparatus of claim 15, wherein the multi-slice processor is further configured to carry out:
during the effective address translation, determining a source of the error condition;
determining, in dependence upon a source of the error condition, a corresponding process to be the guest process or a host process, wherein the guest process is nested within the host process, wherein if the source of the error condition occurs during a guest address translation sequence, then the corresponding process is the guest process, and wherein if the source of the error condition occurs during a host address translation sequence of a real address for the guest process, then the corresponding process is the host process; and
generating, for the corresponding process, an interrupt indicating the error condition and the source of the error condition.

17. The apparatus of claim 15, wherein the effective address translation for the effective address for the instruction corresponding to the cache miss is initiated in contravention of a cache hit for the effective address for the instruction.

18. The apparatus of claim 15, wherein the multi-slice processor is further configured to carry out:
- determining, at the load/store slice, a second real address from a second cache hit in the translation cache for a second effective address for a second instruction received at the load/store slice;
- determining, at the load/store slice, a second error condition corresponding to an access of the second real address;
- determining, at the load/store slice, a second process type indicating a source of the second instruction to be a host process; and
- responsive to determining the second error condition, initiating, in dependence upon a source of the second instruction being a host process and in dependence upon the second cache hit, generation of an interrupt to the host process to indicate the second error condition.

19. The apparatus of claim 15, wherein an entry of the translation cache storing the read address corresponding to a translation of the effective address stores a field indicating a process type.

20. The apparatus of claim 15, wherein the translation cache is an effective address to real address cache or a translation lookaside buffer.

* * * * *